Sept. 6, 1932.  C. H. JOHNSON  1,875,874
PRESSURE MAINTAINING DEVICE FOR PNEUMATIC TIRES
Filed Nov. 8, 1929

INVENTOR
C. H. Johnson
BY
ATTORNEY

Patented Sept. 6, 1932

1,875,874

UNITED STATES PATENT OFFICE

CHARLES H. JOHNSON, OF SACRAMENTO, CALIFORNIA, ASSIGNOR OF ONE-HALF TO ARTHUR E. MILLER, OF SACRAMENTO, CALIFORNIA

PRESSURE MAINTAINING DEVICE FOR PNEUMATIC TIRES

Application filed November 8, 1929. Serial No. 405,639.

This invention relates to pneumatic tires, my principal object being to provide a device adapted to be easily and removably mounted in connection with the ordinary valve stem of a tire, and actuated by any sudden or uneven flexing of the tire as it moves over the road, for causing the normal or predetermined pressure to be automatically restored to and maintained in the tire.

The device is not intended to restore such pressure to the tire when the pressure therein has fallen excessively low, its value residing in its ability to offset the usual slow leakage of air from the tire and to maintain such pressure at normal. The weekly but easily overlooked check-up of the tires necessary if they are to be kept at the proper pressure and in a good condition is therefore eliminated. At the same time the device is constructed so that it can be connected with a pump hose at any time as readily as the present valve structure and without removing the attachment from the tire.

These objects I accomplish by means of such structure and relative arrangement of parts as will fully appear by a perusal of the following specification and claim.

In the drawing similar characters of reference indicate corresponding parts in the several views.

Figure 1:
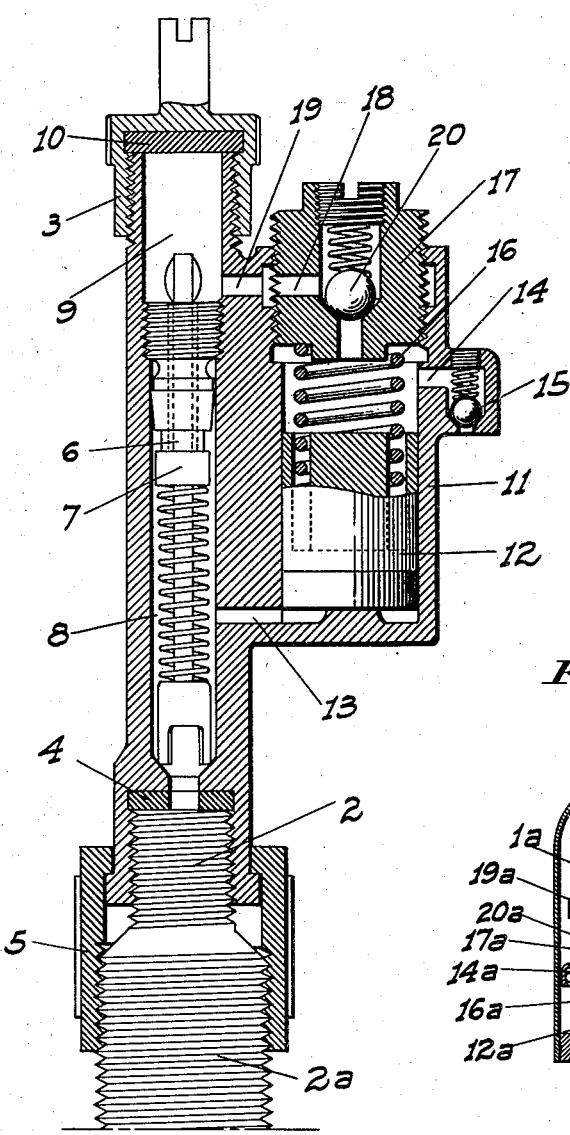
Fig. 1 is a sectional elevation greatly enlarged of one form of my device as applied to an ordinary valve stem.

Referring now more particularly to the characters of reference on the drawing, and particularly at present to Fig. 1, 1 denotes a tubular passage or stem member tapped at the bottom to screw onto the outer end of a standard valve stem 2 which is connected to and projects outwardly from the tire as usual. Said member 1 is also threaded at the top to receive the ordinary cap 3 which has been removed from the stem 2. An air sealing gasket 4 is placed between the stem 2 and the member 1 and the latter has a lock sleeve or nut 5 associated therewith at its lower end to screw onto the larger portion 2a of the stem and thus prevent possible loosening of the member 1 relative to the stem 2.

The usual valve mechanism of the stem 2 is removed therefrom so that said stem becomes merely a passage, and said mechanism instead is mounted in the member 1. This mechanism includes as usual a valve seat 6 and a movable valve 7, normally closed and opening only toward the tire or stem 2. An air-tight chamber 8 is therefore formed in the member 1 below the valve and another air-tight chamber 9 is formed in said member above the valve; a gasket 10 between the cap 3 and the member 1 insuring an air-tight connection between these parts.

Formed with the member 1 to one side of the same is a cylinder 11 in which a plunger or piston 12 is slidable with a close air-tight fit. A passage 13 leads from the chamber 8 to the bottom of the cylinder below the piston, while another passage 14 leads from the atmosphere to the cylinder from a point some distance above the piston when the latter is in its lowermost position. This passage has a check valve 15 therein opening only toward the cylinder.

A compression spring 16 is disposed between the piston and an adjustable nut 17 mounted in the outer end of the cylinder, so that the pressure of the spring against the piston tends to hold the same down; this spring being set by adjustment with the nut according to the desired air pressure below which it is desired the device shall function. The passage 18 in the nut communicates, regardless of the adjusted position of said nut, with a passage 19 in the member 1 leading to the chamber 9. A normally closed spring pressed valve 20, preferably of the ball type, is interposed in the passage 18 so as to open only away from the cylinder or toward the chamber 9.

The operation of the device is based on the fact that any sudden flexing of the tire such as is occasioned by the passage of the same over rocks or bumps on the road, temporarily reduces the area of the tire and thereby increases the air pressure therein.

To show the action of such sudden increase of air pressure on the pressure maintaining device, let it be assumed that the spring 16 has been set to allow the device to function up to a pressure of 35 pounds and that the pressure in the tire has dropped to thirty pounds. The spring 16 is so arranged that this thirty-five pound resistance will be only effective on the piston after the latter has moved some distance from its normal seated or bottom position.

At the start air pressure in the cylinder above the piston is atmospheric only, as is that in the chamber 9. Let it be also assumed that every time the tire is suddenly flexed the pressure therein is momentarily increased to thirty-two pounds. This extra two pounds of pressure acting as a sudden puff or blast through the stem 2 and into the passage 13, acts to push the piston outwardly, temporarily overcoming the resistance of the spring 16. With the upward movement of the piston the valve 15 closes the intake passage 14, and the air trapped in the cylinder above the piston is forced past the valve 20 and into the chamber 9 through the passages 18 and 19. The return downward movement of the piston creates the return tendency to vacuum in the cylinder, causing the valve 15 to open and air from the outside to rush in. A certain amount of air is thus forced into and trapped in the chamber 9 with each movement of the piston. While this amount is of course very small, with repeated flexings of the tire and corresponding movements of the piston the air pressure in said chamber 9 is gradually built up until it finally becomes greater than the steady pressure had in the tire at the time. This relatively great pressure in the chamber 9 then causes the valve 7 to open (between flexings of the tire) and the air is admitted to the tire until the pressure in said chamber 9 and that of the tire become equalized.

The valve 7 then automatically closes, until with further movements of the piston the air pressure is again built up in the chamber 9 to an extent greater than that in the tire. This continues until the steady pressure in the tire is brought up to the desired maximum, whereupon such pressure acting on the piston 12 constantly holds the same in a raised position. Any further upward movement of the piston due to a momentary increase of pressure in the tire will not cause any air to be delivered into the chamber. This is because the intake is either enclosed by the piston itself or the movement of the latter is so slight that the tendency to vacuum is sufficient to cause any appreciable amount of air to be taken into the cylinder above the piston, and consequently no air will be forced into the chamber 9. Removal of the cap 3 enables a pump hose to be readily applied to the device to quickly restore the tire to the desired pressure at any time.

Figure 2:
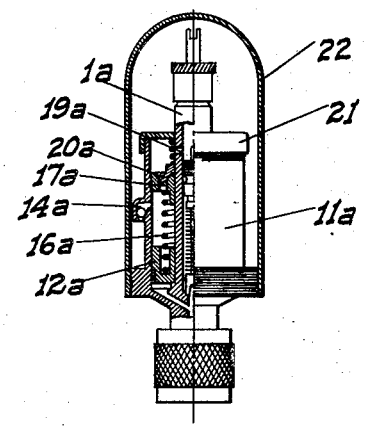
Fig. 2 is a similar view, approximately natural size, of a modified form of the device.

In the type shown in Fig. 2, the principle of operation and the movement of the parts is the same as above described, but the arrangement is different. In this type the cylinder 11a surrounds the valve containing stem 1a in concentric and spaced relation thereto, and the piston 12a is in the form of a ring slidably and closely engaging both the cylinder and the central stem. The nut 17a which controls the setting of the piston spring 16a is adjustable in said cylinder, and forms the seat for the valve member 20a which corresponds to the ball valve 20, but is in the form of a ring of V-section extending about and concentric with the stem 1a.

The passage 19a to the air chamber above the valve therein is above the nut; the necessary air-tight enclosure above said nut being formed by a cap 21 on the cylinder and which also tightly engages the stem 1a. A non-air tight dust cap 22 encloses the entire structure and is screwed onto the cylinder at its bottom, so that the air intake passage 14a to the cylinder is protected against the clogging-up influence of dirt and dust.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

The combination with a tire valve casing and valve, of a pump cylinder having a communicating passage into the valve casing on each side of the valve, a piston in the cylinder operable by pressure impulses imparted thereto by air discharged from the tire on one side of the valve to pump air from the atmosphere into the casing on the other side of the valve, a spring tending to hold the piston against movement by such impulses, and means operable from the exterior of the pump cylinder for adjusting the tension of said spring.

In testimony whereof I affix my signature.
CHARLES H. JOHNSON.